(No Model.)
W. A. PUNGS.
NUT LOCK.
No. 371,149. Patented Oct. 4, 1887.
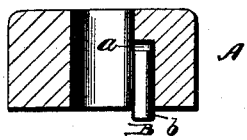
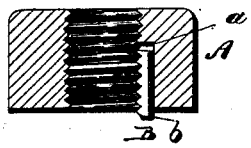
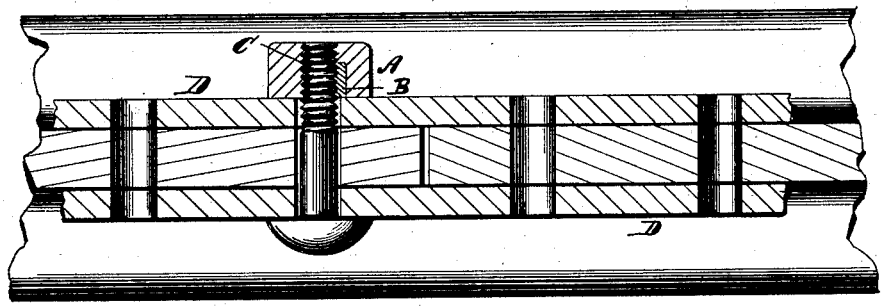
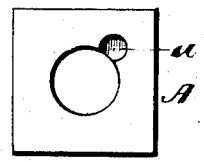
WITNESSES
Samuel E. Thomas
M. B. O'Dogherty
INVENTOR
William A. Pungs
By W. W. Leggett
Attorney

UNITED STATES PATENT OFFICE.

WILLIAM A. PUNGS, OF DETROIT, MICHIGAN, ASSIGNOR TO HIMSELF, JOHN E. KING, CYRENUS A. NEWCOMB, JOHN B. MULLIKEN, ALVA T. HILL, AND COLLINS B. HUBBARD, ALL OF SAME PLACE.

NUT-LOCK.

SPECIFICATION forming part of Letters Patent No. 371,149, dated October 4, 1887.

Application filed February 26, 1887. Serial No. 228,983. (No model.)

*To all whom it may concern:*

Be it known that I, WILLIAM A. PUNGS, of Detroit, county of Wayne, State of Michigan, have invented a new and useful Improvement in Nut-Locks; and I declare the following to be a full, clear, and exact description of the same, such as will enable others skilled in the art to which it pertains to make and use it, reference being had to the accompanying drawings, which form a part of this specification.

My invention relates to an improvement in lock-nuts, and has for its object a simple, economical, and efficient lock-nut for use in railway fish-joints and for other purposes where lock-nuts are desired.

It consists of the combination of devices and appliances, hereinafter specified, and more particularly pointed out in the claims.

In the drawings, Figure 1 is a sectional view illustrating features of my invention before the nut is screw-tapped. Fig. 2 is a similar view of my invention after the tapping is completed. Fig. 3 shows the device as applied to a fish-joint. Fig. 4 is a plan view of the nut shown in Fig. 1.

I carry out my invention as follows:

A represents a nut of any ordinary construction, except that it is provided with an orifice, *a*, which may be bored therein to a desired depth before the nut is screw-tapped, said orifice communicating with the interior of the nut or located adjacent thereto.

B is a metallic pin, constructed to fit in said orifice *a* and to have its adjacent face flush with, or substantially flush with, the inner surface of the nut. In the process of constructing my improved lock-nut this pin is engaged in the orifice *a* before the nut is screw-tapped, but so as to leave its outer extremity exposed to some extent, as shown at *b* in Fig. 2, and also leaving a desired space at the inner end of the orifice, so as to permit the pin being subsequently forced inward and its outer end be brought flush with the adjacent face of the nut. When the pin has been thus partially engaged in the orifice, the nut, together with the pin, is screw-threaded to receive the bolt C.

D is a fish-plate.

It will be observed that the pin, when the lock-nut is ready for application, projects from the face side of the nut which is to be brought into engagement with the fish-plate. Now, it is evident that when the nut is applied to its bolt the pressure will force the pin against the face of the fish-plate, and the subsequent turning of the nut upon its bolt will cause the pin to be driven home in its orifice in the nut as the wrench brings the face of the nut up snug against the fish-plate. The inward movement of the pin thus occasioned will bind it with great firmness against the adjacent portions of the screw-threads upon the bolt, and thereby effectually holds the nut and bolt from disengagement in any accidental or incidental manner. The pin may be made of steel or other hard metal, when its pressure home in its orifice as the nut is applied will upset the adjacent portions of the screw-threads to some extent and make the removal of the nut still more difficult. Still, on the application of a suitable wrench the nut may be removed, if desired, although its removal may strip the adjacent portions of the screw-threads upon the bolt to some degree. A brass or other soft-metal pin may, however, be employed, which will answer every purpose in preventing any inadvertent disengagement of the nut and effectually lock it upon the bolt, while the removal of the nut by the application of a wrench will do less damage, or no damage whatever, to the bolt. The outer end of the pin is preferably rounded to prevent its binding with any unevenness upon the adjacent plate as the nut is forced home upon the bolt. The pin as so applied is the equivalent of a jam-nut without the necessity of employing an extra nut for that purpose. No change in the construction of the bolt is required, and the construction of the nut with its orifice *a* is inexpensive.

Although I have illustrated my improved lock-nut as applied to a fish-joint, I would have it clearly understood that I contemplate its use wherever any nut of this nature is found desirable.

The pressure of the pin upon the threads of the bolt as its projected end impinges upon the fish-plate or other adjacent surface is exerted in one direction as the nut is applied, and its resistance is the same in the opposite direction when a contrary pressure is exerted to dislocate the nut upon the bolt, or vice versa. Thus an effectual resistance is offered in both directions by the pin when properly engaged and forced home, as above described.

It will be observed that the orifice and its pin are both cylindrical. The pins may therefore be simply cut from a wire or rod of suitable gage. The orifice may likewise be formed by the simple operation of boring the nut with a drill of proper size, and the pin be then driven into the orifice so as to make a tight fit. In this condition it is held tight enough to permit a thread to be formed on it coincident with the threads of the nut. So, also, it cannot be lost out endwise nor displaced in shipment; nor can the pin by anything less than a very strong endwise pressure be shifted longitudinally to disturb the coincidence of its threads with those of the nut. Again, it will be observed that the communicating passage between the pin-orifice and the threaded opening of the nut is less in breadth than the diameter of the pin, so that the pin cannot be forced through into the threaded opening of the nut and so be lost or its ready engagement with the bolt be impaired.

The features of the cylindrical orifice and a cylindrical pin, and so, also, the features of the communicating passage between the pin and orifice and the threaded opening of the nut, being of less breadth than the diameter of the pin, I regard as very important, since they enable me without any nice mechanical work— such as cutting or planing—to fit nuts with their pins and to ship them in bulk, just as other nuts are shipped, without danger of the parts becoming either separated or relatively displaced, and the construction is exceedingly simple and inexpensive.

What I claim is—

1. A nut provided with a cylindrical orifice parallel with and adjacent to its central bore and a cylindrical pin tightly fitted therein, projecting slightly beyond the face of the nut and adapted to slide longitudinally in said orifice, said pin provided with threads coincident with the threads of the nut, substantially as described.

2. A nut provided with a cylindrical orifice extending but partially through the nut adjacent and parallel to its central tapped opening and a cylindrical pin fitted tightly into said orifice, projecting slightly from the face of the nut and extending nearly but not quite to the bottom of the orifice, said pin threaded coincident with the threads of the nut, substantially as described.

In testimony whereof I sign this specification in the presence of two witnesses.

WILLIAM A. PUNGS.

Witnesses:
N. S. WRIGHT.
M. B O'DOGHERTY.